United States Patent
Barbier

(10) Patent No.: US 11,149,608 B2
(45) Date of Patent: Oct. 19, 2021

(54) METHOD FOR SELECTIVE CATALYTIC REDUCTION WITH DESORPTION OF AMMONIA FROM A CARTRIDGE IN AN EXHAUST LINE

(71) Applicants: CONTINENTAL AUTOMOTIVE FRANCE, Toulouse (FR); CONTINENTAL AUTOMOTIVE GmbH, Hannover (DE)

(72) Inventor: Pascal Barbier, Tournefeuille (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 16/651,796

(22) PCT Filed: Sep. 19, 2018

(86) PCT No.: PCT/EP2018/075273
§ 371 (c)(1),
(2) Date: Mar. 27, 2020

(87) PCT Pub. No.: WO2019/063368
PCT Pub. Date: Apr. 4, 2019

(65) Prior Publication Data
US 2020/0240308 A1    Jul. 30, 2020

(30) Foreign Application Priority Data
Sep. 29, 2017  (FR) ...................... 1759090

(51) Int. Cl.
*F01N 3/20* (2006.01)
*F01N 9/00* (2006.01)
*B01D 53/94* (2006.01)

(52) U.S. Cl.
CPC ............ *F01N 3/2066* (2013.01); *F01N 9/00* (2013.01); *B01D 53/9495* (2013.01);
(Continued)

(58) Field of Classification Search
CPC .. F01N 3/2066; F01N 9/00; F01N 2610/1406; F01N 2610/105;
(Continued)

(56) References Cited

U.S. PATENT DOCUMENTS 4,302,431 A    11/1981  Atsukawa et al.
4,750,453 A     6/1988  Valdespino
(Continued)

FOREIGN PATENT DOCUMENTS

CN       1854475 A    11/2006
CN     101142382 A     3/2008
(Continued)

OTHER PUBLICATIONS

International Search Report, dated Oct. 16, 2018, from corresponding PCT application No. PCT/EP2018/075273.
(Continued)

*Primary Examiner* — Brandon D Lee
(74) *Attorney, Agent, or Firm* — Nixon & Vanderhye

(57) ABSTRACT

Disclosed is a method for selective catalytic reduction operating by desorbing ammonia from at least one storage cartridge in an exhaust line at the output of a motor vehicle engine, the cartridge being arranged in at least one bypass branch of a main line of the exhaust line. The exhaust gas flow rate in the bypass branch is controlled according to an estimated or measured temperature in the bypass branch and a desired amount of ammonia to be injected by desorption estimated in the exhaust line to provide a catalytic reduction of the nitrogen oxides present in the exhaust gas, a temperature of the cartridge being estimated according to the gas
(Continued)

flow rate at the temperature estimated or measured during a given time interval and corresponding to an amount of desorbed ammonia equal to the desired amount of ammonia.

12 Claims, 1 Drawing Sheet

(52) U.S. Cl.
CPC ............ *B01D 2251/2062* (2013.01); *F01N 2560/026* (2013.01); *F01N 2610/02* (2013.01); *F01N 2610/06* (2013.01); *F01N 2610/102* (2013.01); *F01N 2610/105* (2013.01); *F01N 2610/1406* (2013.01); *F01N 2900/1404* (2013.01); *F01N 2900/1411* (2013.01)

(58) Field of Classification Search
CPC ......... F01N 2610/102; F01N 2560/026; F01N 2610/02; F01N 2610/06; F01N 2900/1404; F01N 2900/1411; F01N 2410/03; F01N 2560/021; F01N 2570/18; F01N 3/208; F01N 3/0871; F01N 3/2892; B01D 53/9495; B01D 2251/2062; Y02A 50/20; Y02T 10/12
See application file for complete search history.

(56) References Cited

U.S. PATENT DOCUMENTS

| | | |
|---|---|---|
| 6,383,463 B1 | 5/2002 | Mochida et al. |
| 7,594,391 B2 | 9/2009 | I et al. |
| 7,736,595 B2 | 6/2010 | Gady et al. |
| 7,849,675 B2 | 12/2010 | Ripper et al. |
| 8,464,517 B2 | 6/2013 | Fujita |
| 8,584,446 B2 | 11/2013 | Arrigoni et al. |
| 8,650,861 B2 | 2/2014 | Arrigoni et al. |
| 8,784,740 B2 | 7/2014 | Wada et al. |
| 9,010,091 B2 | 4/2015 | Johannessen et al. |
| 9,080,489 B2 | 7/2015 | Onodera et al. |
| 9,328,642 B2 | 5/2016 | Yacoub |
| 9,464,554 B2 | 10/2016 | Matsuo et al. |
| 9,512,760 B2 | 12/2016 | Clayton, Jr. et al. |
| 10,125,701 B2 | 11/2018 | Weiss et al. |
| 10,947,466 B2 | 3/2021 | Liss et al. |
| 2006/0051638 A1 | 3/2006 | Gross |
| 2006/0236682 A1* | 10/2006 | I .............................. F02P 5/1502 60/288 |
| 2009/0025370 A1 | 1/2009 | Kondo et al. |
| 2009/0113876 A1 | 5/2009 | Grunditz et al. |
| 2009/0282813 A1 | 11/2009 | Kopinsky |
| 2010/0021780 A1 | 1/2010 | Johannessen et al. |
| 2011/0131951 A1* | 6/2011 | Arrigoni ................. F01N 3/027 60/274 |
| 2012/0288774 A1* | 11/2012 | Johannessen ...... B01D 53/9495 429/416 |
| 2015/0252949 A1 | 9/2015 | Johannessen et al. |
| 2016/0169074 A1* | 6/2016 | Clayton, Jr. .......... F01N 3/2053 60/274 |

FOREIGN PATENT DOCUMENTS

| | | |
|---|---|---|
| CN | 101639005 A | 2/2010 |
| CN | 101678275 A | 3/2010 |
| CN | 101683589 A | 3/2010 |
| CN | 101965440 A | 2/2011 |
| CN | 102132096 A | 7/2011 |
| CN | 102165151 A | 8/2011 |
| CN | 102918245 A | 2/2013 |
| CN | 103615299 A | 3/2014 |
| CN | 103982279 A | 8/2014 |
| CN | 104838100 A | 8/2015 |
| CN | 204941656 U | 1/2016 |
| CN | 105370354 A | 3/2016 |
| CN | 105604653 A | 5/2016 |
| CN | 105673159 A | 6/2016 |
| CN | 105944567 A | 9/2016 |
| CN | 106968811 A | 7/2017 |
| DE | 102009060288 A1 | 6/2011 |
| EP | 2944779 A1 * | 11/2015 ........... F01N 3/2066 |
| EP | 2944779 A1 | 11/2015 |
| GB | 118777 A | 9/1918 |
| GB | 187035 A | 10/1922 |
| JP | 2004-270609 A | 9/2004 |
| KR | 20160110017 A | 9/2016 |
| WO | 2006/034891 A1 | 4/2006 |
| WO | 2009/004439 A2 | 1/2009 |
| WO | 2017/132542 A1 | 8/2017 |

OTHER PUBLICATIONS

Office Action issued in Chinese Patent Application No. 201880063254.4 dated Apr. 28, 2021.

* cited by examiner

METHOD FOR SELECTIVE CATALYTIC REDUCTION WITH DESORPTION OF AMMONIA FROM A CARTRIDGE IN AN EXHAUST LINE

BACKGROUND OF THE INVENTION

Field of the Invention

The present invention relates to a method for selective catalytic reduction with desorption of ammonia from a cartridge in a motor vehicle combustion engine exhaust line.

Description of the Related Art

More than 95% of diesel engines will be equipped with a device for the treatment of nitrogen oxides in the exhaust line. This could apply in the very near future to gasoline fuel engines.

In order to do this, in motor vehicles, in particular with a diesel engine, it is known practice to equip an internal combustion engine exhaust line with a selective catalytic reduction system with injection of reducing agent into the line, a monitoring-control unit receiving the estimates or measurements of amounts of nitrogen oxides exiting through the exhaust line at least downstream of the selective catalytic reduction system.

For decontamination from the nitrogen oxides or NOx, a selective catalytic reduction (SCR) system is thus frequently used. Subsequently, in the present patent application, the selective catalytic reduction system may also be mentioned by its abbreviation SCR, just as the nitrogen oxides may be mentioned under their abbreviation NOx and ammonia under its chemical formula $NH_3$.

There mainly exist two types of SCR systems. In the first type of SCR system, use is made of a liquid reducing agent intended to be introduced in predefined amounts and by consecutive injections into an exhaust line of a motor vehicle. The addition of this decontaminating reducing agent carries out the treatment of the NOx present in the exhaust line of the combustion engine of the motor vehicle. This SCR reducing agent is frequently ammonia or an ammonia precursor, for example urea or a urea derivative, in particular a mixture known under the Adblue® brand-name.

In a second type of SCR system, it is at least one ammonia storage cartridge, the ammonia being advantageously stored chemically, which delivers the ammonia by desorption on being heated. Conventionally, electrical heating means are provided for the desorption of the ammonia. Several ammonia storage cartridges can be provided in the exhaust line. This represents the first state of the art of an SCR system operating with one or more ammonia desorption cartridges.

This first state of the art exhibits the disadvantage of requiring means, advantageously electrical, for heating the cartridge or each of the cartridges. This increases the cost of such a cartridge SCR system, all the more so since the heating is carried out from the outside of the cartridge with energy losses. The heating means are supplied by the battery of the vehicle or by the alternator, which can reduce the charging of the battery and be a loss of electrical power.

The document US-A-2016/169074 describes a second state of the art combining an SCR system for a combustion engine with an ammonia storage cartridge. The SCR system comprises an injector positioned in the exhaust line and configured in order to inject a reducing agent into the exhaust stream. The exhaust line can comprise a branch mounted as a bypass of a main line pipe downstream of the injector. A valve is positioned in the bypass branch in order to cause exhaust gases to pass or to prevent exhaust gases from passing into the bypass branch.

A storage device in the form of an ammonia storage cartridge is positioned in the bypass branch and is configured in order to store ammonia withdrawn from the exhaust gases. The SCR system can also include a control module configured in order to selectively actuate the valve and to store or not store ammonia in the cartridge.

This document is thus directed at an SCR system by injection of a reducing agent, that is to say of the first type, the cartridge acting as backup in order to store an amount of ammonia temporarily in the line and not being the first and only ammonia supply source. The role of this cartridge is to provide ammonia more quickly at the start of the cycle or during low temperature runs for the catalytic reduction and is not to be the main source of ammonia injected into the line.

On the contrary, the problem underlying the present invention is, for a selective catalytic reduction system with one or more storage cartridges as sources of ammonia in a motor vehicle combustion engine exhaust line, to carry out a desorption of the ammonia which is the minimum amount of ammonia necessary to reduce the nitrogen oxides then present in the gases discharged from the engine by the exhaust line.

Also known is the document EP 2 944 779 A1, which relates to an exhaust system of an internal combustion engine for the post-treatment of the exhaust gases comprising an exhaust pipe originating from an exhaust manifold of the internal combustion engine, a tank for collecting a certain number of solid matrices capable of storing ammonia, an ammonia distribution pipe which originates from the tank and which leads to the exhaust pipe, and a circuit supplying a heating fluid to the tank, designed in order to make possible the exchange of heat from the heating fluid to the number of solid matrices capable of storing ammonia, in which the supply circuit comprises a bypass valve which is appropriate for adjusting the amount of heating fluid supplied to the tank. This document shows a specific pipe for introducing ammonia into the exhaust line and a separate additional pipe for reintroducing the exhaust gases into the exhaust line. As represented in FIG. 1, the bypassing of the exhaust gases takes place upstream of the oxidation catalytic converter/particulate filter.

SUMMARY OF THE INVENTION

The present invention proposes to improve the existing devices.

To this end, the present invention relates to a method for selective catalytic reduction operating by desorption of ammonia from at least one storage cartridge in an exhaust line at a motor vehicle combustion engine outlet, said at least one cartridge being positioned in at least one bypass branch of a main pipe of the exhaust line, a regulation of a flow rate of the exhaust gases in said at least one bypass branch being carried out as a function of the temperature of the exhaust gas measured or estimated in said at least one branch in order for said at least one cartridge to be brought to a temperature sufficient to desorb an amount of ammonia necessary for a reduction of the nitrogen oxides present in the exhaust gases, characterized in that the exhaust gas flow rate in said at least one bypass branch is regulated as a function of a temperature estimated or measured in the bypass branch and of a desired amount of ammonia to be injected by estimated desorption into the exhaust line in order to ensure a catalytic reduction of the nitrogen oxides present in the exhaust gases, a temperature of said at least one cartridge being estimated as a function of the gas flow rate at the estimated or measured temperature during a given time interval and corresponding to a desorbed amount of ammonia equal to the desired amount of ammonia, an updating of the desired amount of ammonia being made by estimation or measurement of the amount of nitrogen oxides remaining in the exhaust line downstream of the catalytic reduction.

Compared to a first state of the art for which a cartridge is heated by electrical means, the present invention exhibits the advantage of not requiring auxiliary heating means which are electrical means, resulting in a saving of elements employed and also zero stress on the battery or on the alternator of the vehicle. The present invention requires only the presence of a bypass branch and of a valve associated with this bypass branch.

The energy for the heating is directly recovered in the exhaust gases, energy which would otherwise be lost. The flow rate of the gases and the temperature of the gases in the exhaust line are already measured or estimated for other engine control and decontamination functions and the method of the present invention thus uses means already present on the exhaust line, which represents an economy of means.

Compared to a second state of the art, illustrated by the document US-A-2016/169074, for which a cartridge is positioned in a bypass branch of an exhaust line main pipe, the cartridge of this document is used, in operation of a selective catalytic reduction system with injection of reducing agent positioned upstream of the cartridge, to recover ammonia and not to inject it into the branch. It follows that the control of the temperature and of the flow rate of the exhaust gases proposed in the context of the method according to the present invention is completely different from that proposed in this document, the mode of desorption of a sufficient amount of ammonia for a reduction of the nitrogen oxides present in the exhaust gases not being described in this document, given that this document is concerned only with the storage of surplus ammonia in the line.

Specifically, if the ammonia stored according to the method described in this document is intended to be desorbed, the conditions of such a desorption are not described in this second state of the art. This is, on the other hand, the inventive contribution of the present invention, which proposes to regulate the flow rate of the gases as a function of the temperature of the exhaust gases measured or estimated in said at least one branch in order for said at least one cartridge to desorb a sufficient amount of ammonia for a reduction of the nitrogen oxides present in the exhaust gases.

The temperature inside the cartridge follows the temperature of the exhaust gases with thermal inertia. The higher the gas flow rate, the more the temperature of the cartridge will follow the temperature of the exhaust gases. It is known that, at specific temperatures, the cartridge will release a predetermined amount of ammonia. The invention proposes, knowing the amount of nitrogen oxides to be reduced in the exhaust line and consequently the amount of ammonia necessary for the reduction, to manage the flow rate and the temperature of the gases in said at least one bypass branch housing at least one cartridge in order for this amount of ammonia necessary for the reduction to be desorbed. There may optionally be taken into account an amount of ammonia estimated to be stored in the selective catalytic reduction catalytic converter in order to estimate as closely as possible the amount of ammonia to be desorbed.

Advantageously, in order to ensure a start of desorption of said at least one cartridge, the flow rate of the exhaust gases in said at least one branch is regulated as a function of the temperature of the exhaust gases in said at least one branch in order for said at least one cartridge to reach a predetermined desorption start temperature for said at least one cartridge of 80° C. with a variation range of 15% around this desorption start temperature, and, at an end of life of said at least one cartridge, in order to ensure a complete emptying of the latter, a remaining amount of ammonia in the cartridge being estimated by subtracting, from the initial amount of ammonia contained in a new cartridge, a desorbed amount of ammonia estimated as a function of the temperatures and flow rates, stored in computer memory, in the branch associated with the cartridge and, when the remaining amount of ammonia in said at least one cartridge is equal to a predetermined percentage of the initial amount of ammonia representative of said at least one virtually empty cartridge varying from 0% to 20%, an increase in flow rate is carried out in said at least one branch in order for said at least one cartridge to reach a predetermined maximum desorption temperature equal to 150° C. with a variation range of 15% around this maximum desorption temperature.

These values depend on the type of cartridge used and on its mode of storage. For a nonlimiting example, a cartridge can desorb seven moles of ammonia at a first temperature of 85° C. and an additional mole above a second temperature of 150° C. The first temperature should be reached as rapidly as possible with a high flow rate in the bypass branch in order to ensure a satisfactory decontamination in nitrogen oxides as rapidly as possible. Exceeding the second temperature makes it possible to empty the cartridge at the end of life.

The invention also relates to an exhaust line at the motor vehicle combustion engine outlet, the exhaust line comprising a selective catalytic reduction system operating by desorption of ammonia from at least one storage cartridge, the exhaust line employing such a method, characterized in that said at least one cartridge is positioned in at least one bypass branch of a main pipe of the exhaust line, a valve being present in said at least one branch or on the exhaust line and regulating a flow of exhaust gases in said at least one branch, a means for estimating or measuring a temperature of the exhaust gases in said at least one bypass branch being present, a controller of the reduction system managing the valve for a desorption of a necessary amount of desorbed ammonia, characterized in that the controller incorporates a mapping giving a temperature of said at least one cartridge as a function of the temperature and of the flow rate of the exhaust gases in said at least one bypass branch.

The implementation of the present invention requires only the addition of one or more bypass branches and of a valve associated with the or with each branch, as well as a software modification of the controller of the reduction system for a regulation of the amount of ammonia desorbed by the flow rate and the temperature of the gases and no longer by a source of electrical energy, as proposed by the first state of the art. The means for estimating or measuring the flow rate and the temperature of the gases are already present in an exhaust line.

Advantageously, the valve is positioned at an inlet branch point of said at least one bypass branch on the main pipe of the exhaust line, the valve being a three-way valve, or the valve is positioned downstream of the inlet branch point of said at least one bypass branch in said at least one branch, the valve being a two-way valve adjustable in several opening positions between a complete opening and a complete closing of the valve.

Advantageously, when the valve is a two-way valve adjustable in several positions, the main pipe of the exhaust line comprises a back-pressure element positioned downstream of the inlet branch point and upstream of an outlet branch point of said at least one bypass branch. This back-pressure element can be a valve placed upstream of a branch point of a line for recirculation of exhaust gases to an air intake of the combustion engine or any other means making it possible to produce a back-pressure in the main pipe of the exhaust line.

Advantageously, the exhaust line exhibits a selective catalytic reduction catalytic converter of the selective catalytic reduction system downstream of the bypass branch on the exhaust line, an ammonia sensor being positioned upstream of the selective catalytic reduction catalytic converter and downstream of the bypass branch and/or a nitrogen oxides sensor being positioned downstream of the reduction catalytic converter in the exhaust line. Commonly, an upstream nitrogen oxides sensor can be positioned upstream of the bypass branch or branches, advantageously directly downstream of a reduction catalytic converter and/or of a particulate filter.

Advantageously, the exhaust line comprises at least two bypass branches each containing at least one cartridge, the valves of said at least two bypass branches being managed with different openings and closings. This is done provided that an addition of the two amounts of ammonia which are produced in each of said at least two branches gives the amount of ammonia desired. This allows great ease of adjustment.

This is because, for example, a cartridge in a bypass branch can be close to being empty, in which case the temperature in its bypass branch is increased in order to carry out a complete emptying of the cartridge with increase in the amount of ammonia desorbed, while another cartridge in another bypass branch exhibits a lower temperature for a lower amount of desorbed ammonia, being, for example, between the first and second temperatures mentioned above.

Advantageously, said at least one cartridge is of elongated shape and comprises a median longitudinal passage passing entirely through it for the exhaust gases. This allows it to be heated uniformly inside.

BRIEF DESCRIPTION OF THE DRAWINGS

Other characteristics, aims and advantages of the present invention will become apparent on reading the detailed description which will follow and on examining the appended drawings, given by way of nonlimiting examples and in which.

DESCRIPTION OF THE PREFERRED EMBODIMENTS

Figure 1:
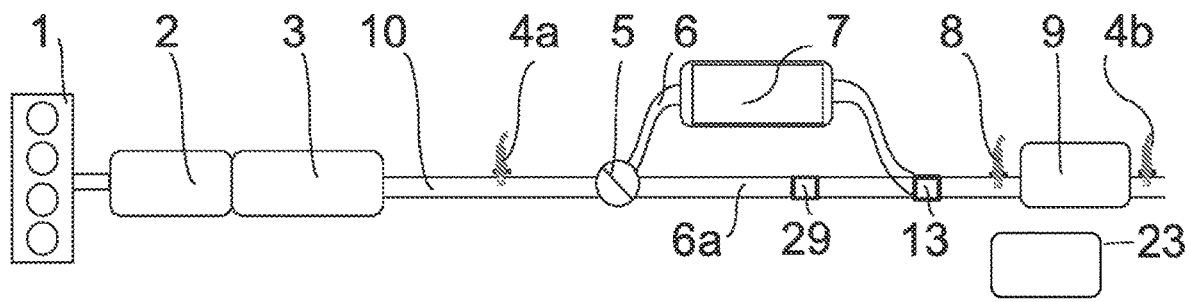
FIG. 1 shows an assembly of a combustion engine and of an exhaust line exhibiting a bypass branch comprising an ammonia storage cartridge according to an embodiment of the present invention.

In that which follows, reference is made to all the figures taken in combination. When reference is made to one or more specific figures, these figures are to be taken in combination with the other figures in order to recognise the designated reference numerals.

With reference to FIG. 1, there is shown a combustion engine 1 and an exhaust line 10 for discharge of the exhaust gases resulting from the combustion in the combustion engine 1. The exhaust line 10 can comprise, in the vicinity of an exhaust manifold of the engine 1, a reduction catalytic converter 2 and a particulate filter 3, for a compression-ignition engine 1, in particular a diesel engine 1 or an engine running on gas oil.

In the case of a spark-ignition combustion engine, in particular an engine running on gasoline fuel or on a mixture containing gasoline, the line 10 can comprise a three-way catalytic converter and a gasoline particulate filter.

An upstream nitrogen oxides probe 4a, also denoted upstream NOx probe, is positioned downstream of the particulate filter 3. Not all the characteristics relating to the reduction catalytic converter 2, to the particulate filter 3 and to the upstream NOx probe 4a are essential for the implementation of the present invention.

Subsequently, the exhaust line 10 is divided into a main exhaust pipe 6a and at least one bypass branch 6. The bypass branch 6 illustrated in FIG. 1 comprises an ammonia storage cartridge 7. In FIG. 1, there is shown a valve 5 positioned at the inlet branch point of the bypass branch 6 on the exhaust line 10 upstream of the main pipe 6a.

At the outlet branch point of the bypass branch 6 where it returns to the main pipe 6a of the exhaust line 10, there is shown a mixer 13 of the ammonia with the exhaust gases, in particular the exhaust gases which have passed in transit through the main pipe 6a.

Finally, downstream of the outlet branch point of the bypass branch 6, an ammonia probe 8 can be positioned upstream of a selective catalytic reduction catalytic converter 9 or SCR catalytic converter forming part of an SCR system supplied by the cartridge 7. There is provided, downstream of the SCR catalytic converter 9, a downstream NOx probe 4b which makes it possible to check whether all the nitrogen oxides have been reduced. The mixer 13, the downstream NOx probe 4b and the ammonia probe 8 are not essential for the implementation of the present invention, whereas the selective catalytic reduction catalytic converter 9 is essential.

The present invention relates to a selective catalytic reduction method operating by desorption of ammonia from at least one storage cartridge 7 in an exhaust line 10 at the outlet of a motor vehicle combustion engine 1, for example in an exhaust line 10 as shown in the figure, which is not limiting. There may be several bypass branches 6 from a main pipe 6a of the exhaust line 10 comprising one or more storage cartridges 7. The cartridge(s) 7 are positioned in the bypass branch(es) 6 of the main pipe 6a of the exhaust line 10.

In the method according to the invention, an exhaust gas flow rate in the bypass branch(es) 6 is regulated as a function of the temperature of the exhaust gases measured or estimated in each bypass branch 6 respectively in order for the cartridge(s) 7 in each bypass branch 6 to be brought to a temperature sufficient to desorb an amount of ammonia necessary for a reduction of the nitrogen oxides present in the exhaust gases.

The exhaust gas flow rate in the bypass branch(es) 6 can be regulated as a function of a temperature estimated or measured in each bypass branch 6 and of a desired amount of ammonia to be injected by estimated desorption into the exhaust line 10 in order to ensure a catalytic reduction of the nitrogen oxides present in the exhaust gases.

The reaction time for the desorption of the ammonia from the cartridge is known. It is thus possible to anticipate the amount of ammonia desorbed during a predefined time interval.

The temperature of each cartridge 7 can be estimated as a function of the gas flow rate at the estimated or measured temperature during a given time interval and corresponding to a desorbed amount of ammonia equal to the desired amount of ammonia.

The desired amount of ammonia can be updated by estimating or measuring the amount of nitrogen oxides remaining in the exhaust line 10 downstream of the catalytic reduction, this advantageously by measurement of the downstream NOx probe 4b.

The amount of ammonia desorbed can be monitored by measurement of the ammonia probe 8 upstream of the selective catalytic reduction catalytic converter 9.

It is known that a storage cartridge 7 desorbs the ammonia which the cartridge 7 contains only above a minimum temperature. In order to ensure a start of desorption of each cartridge 7, the flow rate of the exhaust gases in the branch 6 containing the respective cartridge 7 can be regulated as a function of the temperature of the exhaust gases in the branch in order for the cartridge 7 to reach a predetermined desorption start temperature.

This first predetermined desorption start temperature for the cartridge 7 can be 80° C. with a variation range of 15% around this desorption start temperature.

At the end of life of a cartridge 7, a remaining amount of ammonia in the cartridge 7 can be estimated by subtracting, from the initial amount of ammonia contained in a new cartridge 7, a desorbed amount of ammonia estimated as a function of the temperatures and flow rates, stored in computer memory, in the branch associated with the cartridge 7.

To ensure complete emptying of the cartridge 7, when the remaining amount of ammonia in said at least one cartridge 7 is equal to a predetermined percentage of the initial amount of ammonia representative of said at least one virtually empty cartridge 7 varying from 0 to 20%, an increase in flow rate is carried out in the branch containing the cartridge 7 to be completely emptied in order for the cartridge 7 to reach a predetermined maximum desorption temperature equal to 150° C. with a variation range of 15% around this maximum desorption temperature.

Figure 2:
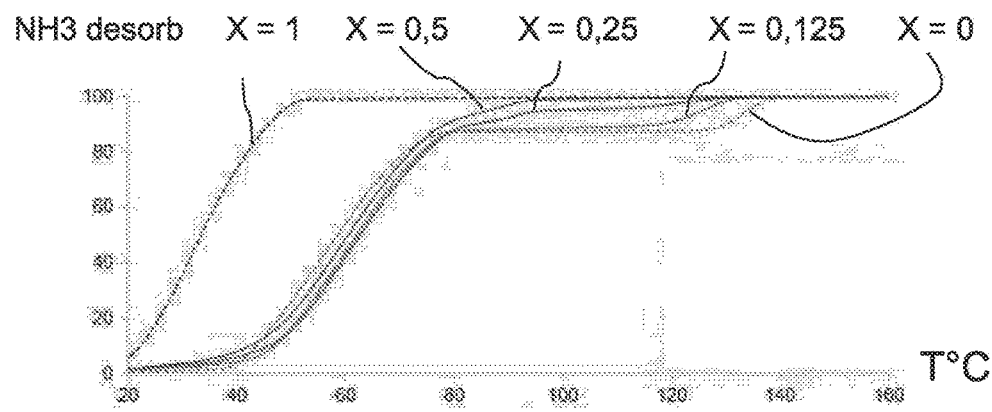
FIG. 2 shows five curves of desorption, as percentage, of ammonia as a function of the temperature in degrees Celsius for five different formulations of storage salts in an ammonia storage cartridge which can be used in an exhaust line according to an embodiment of the present invention.

FIG. 2 shows five curves of desorption, as percentage, of ammonia as a function of the temperature in degrees Celsius for five different formulations of storage salts in an ammonia storage cartridge which can be used in an exhaust line according to an embodiment of the present invention. The salt is a barium strontium dichloride of formula $Ba_xSr_{(1-x)}Cl_2$ mixtures with x respectively equal to 1, 0.5, 0.25, 0.125 and 0. There is shown, on the ordinate, a desorption of ammonia, $NH_3$ desorb, as percentage of an amount of ammonia initially contained as a function of a temperature T in degrees Celsius T° C. on the abscissa.

Preferentially, formulations for which the desorption temperature is greater than 40° C. will be selected in order to avoid undesired desorption at ambient temperature.

Looping with regard to the temperature necessary to release the ammonia, for example between 40-80° C. and 100-150° C., makes it possible to determine the level of filling of the cartridge.

The presence of a stationary phase between 80-100° C. and 120-150° C. to release the last moles of ammonia makes it possible to further improve the accuracy of estimation of amount remaining when a cartridge is virtually empty, for example with an amount of ammonia of less than 20% of the amount of ammonia initially contained, thus signaling the need to switch to a new cartridge.

The curve with x equal to 0 shows a percentage of ammonia desorption which is relatively constant at more than 80% of desorbed $NH_3$, $NH_3$ desorb, for temperatures of between 80 and 130° C., while such a stationary temperature phase for a relatively constant ammonia desorption does not exist for x equal to 0.5 or 0.25 or is shorter for x equal to 0.125.

In another nonlimiting example which is not shown in the figures, use is made of a strontium dichloride $SrCl_2$, which becomes strontium dichloride octamine $Sr(NH_3)_8Cl_2$ by absorbing ammonia or $NH_3$ at low temperature. At a mean temperature of approximately 80° C. with a variation range of 15% around this temperature, desorption of the ammonia begins, releasing, according to the chemical reaction shown, at this temperature, seven moles of $NH_3$. The strontium dichloride octamine then becomes strontium dichloride monoamine of formula $Sr(NH_3)Cl_2$.

At a temperature of 150° C. with a variation range of 15% around this temperature, there occurs, in addition to the first chemical reaction, a reaction on the strontium dichloride monoamine of formula $Sr(NH_3)Cl_2$ to release one mole of $NH_3$ while becoming strontium dichloride $SrCl_2$. From this temperature, all the ammonia of cartridge 7 is released, which would not be the case between 80° C. and below 150° C., where ammonia remains in the form of $Sr(NH_3)Cl_2$.

With reference again more particularly to FIG. 1, an exhaust line 10 for the implementation of a method as described above comprises a selective catalytic reduction system operating by desorption of ammonia from at least one storage cartridge 7, the catalytic reduction system comprising an SCR catalytic converter 9 downstream of the cartridge 7 which is managed by a controller 23.

The cartridge(s) 7 are positioned in at least one bypass branch 6 of a main pipe 6a of the exhaust line 10, i.e. one cartridge 7 for one or for each bypass branch 6 or several cartridges 7 for one or more bypass branches.

A valve 5 is present in branch 6 or for each branch and regulates an exhaust gas flow rate in this associated bypass branch 6. A means for estimating or measuring a temperature of the exhaust gases in the or each bypass branch 6 is present in order for a controller of the reduction system to manage the valve 5 for a desorption of a desired desorbed amount of ammonia in conformity with an amount of ammonia necessary to reduce the nitrogen oxides in the line 10.

The controller of the reduction system can incorporate a mapping giving a temperature of the cartridge(s) 7 as a function of the temperature and of the flow rate of the exhaust gases in the bypass branch 6 which carries a cartridge 7 or cartridges 7.

In a first preferred embodiment of the present invention, the valve 5 can be positioned at an inlet branch point of the associated bypass branch 6 on the main pipe 6a of the exhaust line 10. The valve 5 can be a three-way valve 5.

In a second preferred embodiment of the present invention, which is an alternative to the first embodiment, the valve 5 can be positioned in the associated bypass branch 6 downstream of the inlet branch point of this bypass branch 6. The valve 5 can be a two-way valve 5 adjustable in several opening positions between a complete opening and a complete closing of the valve 5.

For this second preferred embodiment, when the valve 5 is a two-way valve 5 adjustable in several positions, the main pipe 6a of the exhaust line 10 can comprise a back-pressure element 29 positioned downstream of the inlet branch point and upstream of an outlet branch point of said at least one bypass branch 6. This back-pressure element 29 can be a branch element of a line for recirculation of the exhaust gases to an air intake of the combustion engine 1.

The exhaust line 10 can comprise at least two bypass branches 6 each containing one or more cartridges 7, each bypass branch 6 being associated with a respective valve 5. The valves 5 of the bypass branches 6 can be managed with different openings and closings provided that an addition of the two amounts of ammonia produced in each of said at least two branches 6 gives the desired amount of ammonia.

Figure 3:
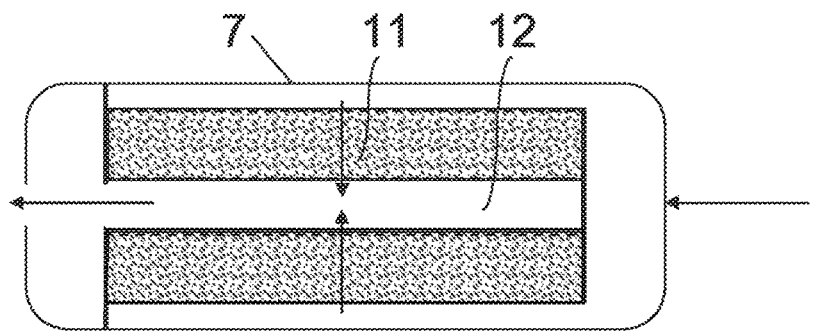
FIG. 3 is a diagrammatic representation of a longitudinal section of an ammonia storage cartridge which can be used in an exhaust line according to an embodiment of the present invention.

FIG. 3 shows an embodiment of an ammonia storage cartridge 7. The cartridge 7 is of elongated shape and comprises a median longitudinal passage 12 passing entirely through it for the exhaust gases. A storage compartment 11 of cylindrical shape surrounds the median longitudinal passage 12. It is this compartment 11 which comprises the ammonia storage material, for example a strontium dichloride, which is not limiting.

The invention claimed is:

1. A method for selective catalytic reduction operating by desorption of ammonia from a storage cartridge (7) in an exhaust line (10) at a motor vehicle combustion engine (1) outlet, said storage cartridge (7) being positioned in a bypass branch (6) of a main pipe (6a) of the exhaust line (10), the method comprising:
    determining a desired amount of ammonia to be injected by desorption from the storage cartridge (7) into the exhaust line (10) to ensure catalytic reduction, at a location along the exhaust line, of nitrogen oxides present in the exhaust gases;
    controlling, via an electronic controller, a valve that diverts the exhaust gas from the exhaust line to the bypass branch in order to regulate a flow rate of the exhaust gases in said bypass branch (6) in order to bring a cartridge temperature of the storage cartridge (7) to a target temperature sufficient to desorb from the storage cartridge the desired amount of ammonia into the exhaust line (10) that ensures a catalytic reduction of the nitrogen oxides present in the exhaust gases,
    the cartridge temperature being estimated at the controller as a function of an amount of desorbed ammonia detected by an ammonia probe located downstream of the storage cartridge, and the valve being controlled based on said estimated cartridge temperature and a mapping, stored in a non-transitory memory of the controller, of cartridge temperatures and temperatures/flow rates of gases in said bypass branch,
    wherein the desired amount of ammonia is updated by repeatedly determining an amount of the nitrogen oxides remaining in the exhaust line (10) downstream of the location along the exhaust line of the catalytic reduction.

2. The method as claimed in claim 1, wherein in order to start desorption of the storage cartridge (7), the flow rate of the exhaust gases in said at least one branch is regulated by the valve so that the storage cartridge (7) reaches a predetermined desorption start temperature of 80° C. with a variation range of 15%, and at an end of life of the storage cartridge (7) when the remaining amount of ammonia in the storage cartridge (7) is equal to a predetermined percentage of an initial amount of ammonia varying from 0% to 20%, an increase in flow rate is implemented by said valve in order for the storage cartridge (7) to reach a predetermined maximum desorption temperature equal to 150° C. with a variation range of 15%, a remaining amount of ammonia in the storage cartridge (7) being estimated by the controller by subtracting, from an initial amount of ammonia of a new cartridge (7), a desorbed amount of ammonia estimated as a function of estimated cartridge temperatures stored in the memory of the electronic controller.

3. An exhaust line (10) at the motor vehicle combustion engine (1) outlet, the exhaust line (10) comprising:
    a main pipe (6a);
    a bypass branch (6) that diverges from the main pipe (6a) at a first location and rejoins the main pipe (6a) at a second location downstream of the first location;
    a selective catalytic reduction (SCR) catalytic converter (9) located downstream of the second location;
    a storage cartridge (7) positioned in the bypass branch (6), the storage cartridge configured to desorb ammonia for reduction of nitrogen oxides present in exhaust gases in the exhaust line;
    a valve (5) that regulates a flow of exhaust gases from the main pipe (6a) to the bypass branch (6);
    an ammonia probe (8) located downstream of the second location and upstream of the SCR catalytic converter; and
    a controller that controls the valve (5) for managing a desorption of a desired amount of ammonia from the storage cartridge,
    the controller configured to regulate the valve to bring a cartridge temperature of the storage cartridge (7) to a target temperature sufficient to desorb from the storage cartridge the desired amount of ammonia into the exhaust line (10),
    wherein the controller includes a non-transitory memory having stored therein a mapping of cartridge temperature to a temperature and flow rate of the exhaust gases in said bypass branch (6),
    the controller configured to apply an amount of desorbed ammonia detected by the ammonia probe to the mapping stored in the non-transitory memory in order to estimate the cartridge temperature, and to update the desired amount of ammonia by repeatedly determining an amount of the nitrogen oxides remaining in the exhaust line (10) downstream of the SCR catalytic converter.

4. The exhaust line (10) as claimed in claim 3, wherein the valve (5) is one of i) positioned at an inlet branch point of the storage bypass branch (6) on the main pipe (6a) of the exhaust line (10), the valve (5) being a three-way valve, or ii) positioned downstream of the inlet branch point of the bypass branch, the valve (5) being a two-way valve adjustable in plural opening positions between a complete opening and a complete closing of the valve (5).

5. The exhaust line (10) as claimed in claim 3,
    wherein the valve is positioned downstream of the inlet branch point of the bypass branch, the valve (5) being a two-way valve adjustable in plural opening positions between a complete opening and a complete closing of the valve (5), and
    wherein the main pipe (6a) of the exhaust line (10) comprises a back-pressure element positioned downstream of the inlet branch point and upstream of an outlet branch point of said at least one bypass branch (6).

6. The exhaust line (10) as claimed in claim 3, further comprising:
- a nitrogen oxides sensor (4*b*) being positioned downstream of the SCR catalytic converter (9) in the exhaust line (10).

7. The exhaust line (10) as claimed in claim 3, wherein the storage cartridge (7) is of elongated shape and comprises a median longitudinal passage (12) passing entirely through said at least one cartridge for the exhaust gases.

8. The exhaust line (10) as claimed in claim 4, further comprising:
- a nitrogen oxides sensor (4*b*) being positioned downstream of the SCR catalytic converter (9) in the exhaust line (10).

9. The exhaust line (10) as claimed in claim 5, further comprising:
- a nitrogen oxides sensor (4*b*) being positioned downstream of the SCR catalytic converter (9) in the exhaust line (10).

10. The exhaust line (10) as claimed in claim 4, wherein the storage cartridge (7) is of elongated shape and comprises a median longitudinal passage (12) passing entirely through said at least one cartridge for the exhaust gases.

11. The exhaust line (10) as claimed in claim 5, wherein the storage cartridge (7) is of elongated shape and comprises a median longitudinal passage (12) passing entirely through said at least one cartridge for the exhaust gases.

12. The exhaust line (10) as claimed in claim 6, wherein the storage cartridge (7) is of elongated shape and comprises a median longitudinal passage (12) passing entirely through said at least one cartridge for the exhaust gases.

* * * * *